(12) United States Patent
Siddeeq

(10) Patent No.: US 6,970,157 B2
(45) Date of Patent: Nov. 29, 2005

(54) WEARABLE COMPUTING, INPUT, AND DISPLAY DEVICE

(75) Inventor: Shakoor N. Siddeeq, Sachse, TX (US)

(73) Assignee: QuadTri Technologies, LLC, Lithonia, GA (US)

( * ) Notice: Subject to any disclaimer, the term of this patent is extended or adjusted under 35 U.S.C. 154(b) by 375 days.

(21) Appl. No.: 10/419,542

(22) Filed: Apr. 19, 2003

(65) Prior Publication Data

US 2003/0197678 A1 Oct. 23, 2003

Related U.S. Application Data

(60) Provisional application No. 60/374,589, filed on Apr. 23, 2002.

(51) Int. Cl.[7] .............................................. G09G 5/00
(52) U.S. Cl. ........................ 345/168; 345/169; 368/10
(58) Field of Search .............................. 345/156, 157, 345/160, 167–169, 171; 368/10

(56) References Cited

U.S. PATENT DOCUMENTS

| | | | |
|---|---|---|---|
| 4,988,981 A | 1/1991 | Zimmerman et al. | |
| 5,305,181 A * | 4/1994 | Schultz | 361/680 |
| 5,514,861 A | 5/1996 | Swartz et al. | |
| 5,581,492 A | 12/1996 | Janik | |
| 5,796,354 A | 8/1998 | Cartabiano et al. | |
| 6,097,374 A | 8/2000 | Howard | |
| 6,167,413 A | 12/2000 | Daley, III | |
| 6,184,804 B1 * | 2/2001 | Harrison | 341/22 |
| 6,222,677 B1 | 4/2001 | Budd et al. | |
| 6,590,835 B2 * | 7/2003 | Farine et al. | 368/10 |
| 2001/0043514 A1 | 11/2001 | Kita | |
| 2002/0024500 A1 | 2/2002 | Howard | |
| 2002/0145948 A1 | 10/2002 | Meylan et al. | |

FOREIGN PATENT DOCUMENTS

JP 9152934 6/1997

OTHER PUBLICATIONS

Wrist PC wearable computer, www.L3sys.com, unknown date.
Halfkeyboard, www.halfkeyboard.com, unknown date.

* cited by examiner

Primary Examiner—Sumati Lefkowitz
Assistant Examiner—Ke Xiao
(74) Attorney, Agent, or Firm—Law Offices of Michael Dryja

(57) ABSTRACT

A wearable computing, input, and display device is disclosed. One embodiment of the invention includes a band wrappable around a wrist of a user, one or more input mechanisms, a display mechanism, and a computing mechanism. The input mechanisms are attached to the band and have recessed and extended positions. In the recessed position, the input mechanisms are positioned under the wrist of the user. In the extended position, the input mechanisms are substantially positioned at the user's fingertips. The display mechanism is attached to the band such that it is over the wrist of the user, whereas the computing mechanism is attached to the band and operably coupled to the input and display mechanisms. In an alternate embodiment, the display mechanism is additionally rotatable from a flat position to a raised position, and vice-versa, where the raised position is user controlled for optimal viewing by the user.

22 Claims, 10 Drawing Sheets

WEARABLE COMPUTING, INPUT, AND DISPLAY DEVICE

RELATED APPLICATIONS

This patent application claims priority to the provisional patent application filed on Apr. 23, 2002, having the inventor Shakoor Nelson Siddeeq, and assigned Ser. No. 60/374,589 (confirmation number 5635).

FIELD OF THE INVENTION

This invention relates generally to computing, input, and/or display devices, and more particularly to such devices that are wearable by the user.

BACKGROUND OF THE INVENTION

Using computers has become a ubiquitous activity in today's society. Many users require constant access to their computing devices to maintain their professional or personal lives. For some users, this means that they are tethered to their desktop computers all day long. For other users, this means that they constantly carry laptop or notebook computers that they can access. Still other users carry personal-digital assistant (PDA) devices or cellular phones all day long.

All of these solutions, however, present disadvantages to users to some degree. Users who rely solely upon desktop computers cannot access them when they are away from the places in which the desktop computers are located. Users who rely upon laptop or notebook computers have to lug them around everywhere they go. Even the latest generation of such portable computers are still somewhat unwieldy and heavy to be constantly carried. PDA devices and cellular phones are easily misplaced and lost, and some of these devices are overly large and difficult to store.

A new field of computers that attempts to overcome these difficulties is the wearable computer. A wearable computer is a computing device that a user literally wears on his or her body, as if it were, for example, a piece of clothing, a piece of jewelry, or a wristwatch. Current wearable computer designs, however, are less than ideal. For a wearable computer to be truly useful, the user should be able to easily view and input data when desired, but the wearable computer should otherwise not get in the way of day-to-day activities. However, current wearable computer designs are often unwieldy, and fail these design objectives, either not allowing the user to both easily view and input data, and/or not being readily put out of the way when not needed.

For these and other reasons, therefore, there is a need for the present invention.

SUMMARY OF THE INVENTION

The invention relates to a wearable computing, input, and display device. One embodiment of the invention includes a band wrappable around a wrist of a user, one or more input mechanisms, a display mechanism, and a computing mechanism. The input mechanisms are attached to the band and have a recessed position and an extended position. In the recessed position, the input mechanisms are positioned under the wrist of the user. In the extended position, the input mechanisms are substantially positioned at the user's fingertips. The display mechanism is attached to the band such that it is over the wrist of the user, whereas the computing mechanism is attached to the band and operably coupled to the input and display mechanisms. In an alternate embodiment, the display mechanism is additionally rotatable from a flat position to a raised position, and vice-versa, where the raised position is user controlled for optimal viewing by the user.

Embodiments of the invention provide for advantages over the prior art. The wearable computer of at least some embodiments of the invention is a complete computing solution, providing, computing, input, and display capabilities via a device that has a band to wrap around the wrist of the user to wear like a wristwatch. When the user does not wish to use the computer, its display and input mechanisms are out of the way and do not interfere with the user. This is because the input mechanisms can be put in a recessed position under the band, whereas the display mechanism can be rotated flat against the band. When the user wishes to input data, he or she merely has to extend the input mechanisms to their extended position, whereas when the user wishes to view the display mechanism, he or she can rotate the mechanism in one embodiment so that it is optimally viewable.

Still other aspects, embodiments, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

It is noted that like reference numbers among the figures identify identical components of the computing device depicted in the figures. As a result, in any given figure more reference numbers may be indicated than are described in the detailed description for that figure. However, the components identified by these reference numbers are described in relation to other figures, and such description may be referenced to determine the functionality and identification of the components in figures in which the reference numbers for these components are not particularly described.

Figure 1:
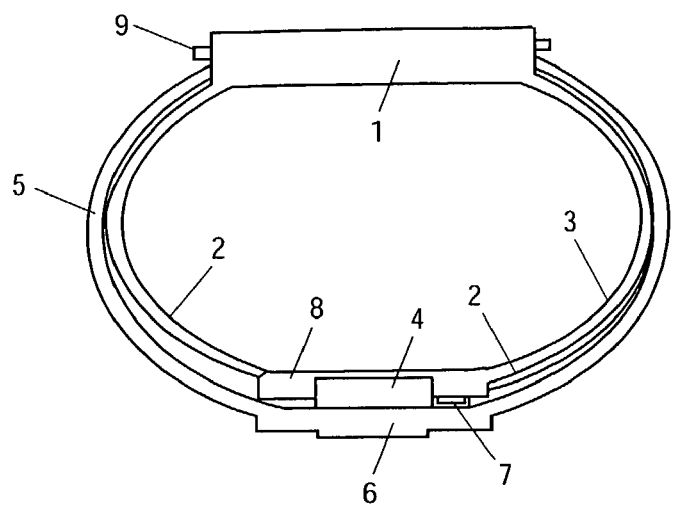
FIGS. 1, 2, and 3 show a front view, a side view, and a perspective view, respectively, of a computing device, according to an embodiment of the invention, in which the input mechanisms are in a recessed position.
Figure 2:
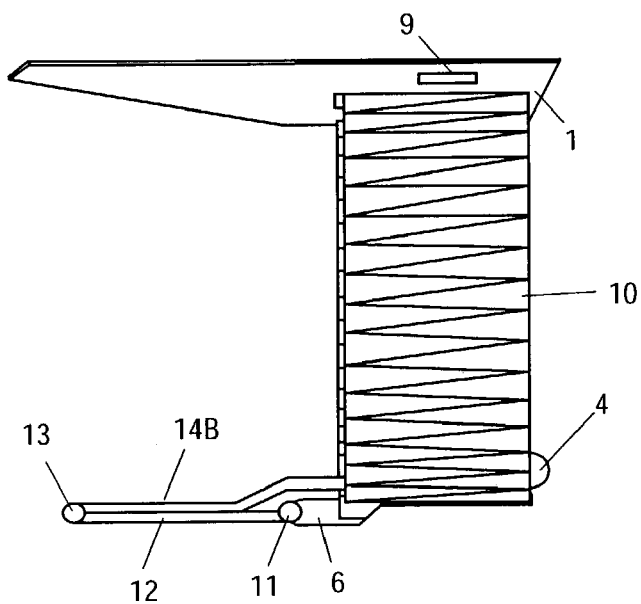
Figure 3:
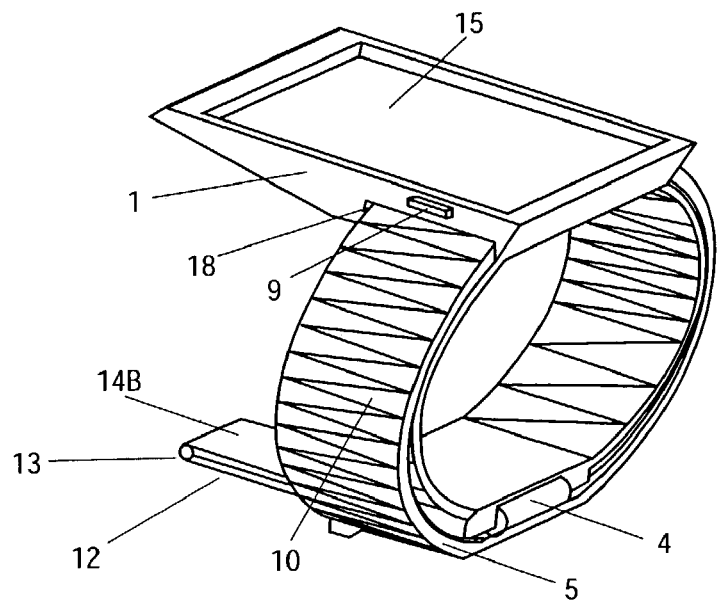

FIGS. 1, 2, and 3 show a front view, a side view, and a perspective view, respectively, of a computing device, according to an embodiment of the invention. The computing device depicted in FIGS. 1, 2, and 3 as having its input mechanisms 10 in a recessed position. While reference is made to a plurality of input mechanisms 10, the input mechanisms 10 may also be considered as a single input mechanism having multiple sections, as can be appreciated by those of ordinary skill within the art, such that the terminology of having a single input mechanism 10 with multiple sections is encompassed by the description of embodiments of the invention herein. The computing device preferably includes a computing mechanism 1 that contains all the electronic components necessary to achieve computing functionality. The outer case may be composed of a rigid polymer, or any other firm material. The shape, length, width, size, or other parameters of the computing device, including the display mechanism 15, may vary from those shown in the figures.

In embodiments of the invention not including the computing mechanism 1 and the display mechanism 15, the device depicted in FIGS. 1, 2, and 3 is alternatively an input device having the input mechanisms 10. Likewise, in embodiments not including the computing mechanism 1 and the input mechanisms 10, the device depicted in FIGS. 1, 2, and 3 is alternatively a display device having the display mechanism 15. Further, the input mechanisms 10 may include one or more of a pointing device, such as a touch pad device, a keyboard having a number of keys, and/or another type of input device. Additionally, the display mechanism 15 and the computing mechanism 1 may be encased within a common housing, such that the housing is detachable from the wristband for use of the computing and the display mechanisms 1 and 15 independent of the input mechanisms 10 and apart from the band. Thus, the computing device in one embodiment is modular.

The display mechanism 15 is optional, and may be a liquid-crystal display (LCD) in one embodiment. In alternative embodiments, the computing device may include wireless communication circuitry that could communicate, for instance, with a heads-up display, a remote personal-digital assistant (PDA) device, or another display mechanism. The wireless communication circuitry may also be used in addition to the display mechanism 15. The computing device may include various buttons, electrical card slots, and other features not depicted in the figures.

The adjustable wristband 2 is wrappable around a wrist of a user, and allows for the computing device to fit on differently sized user wrists. The adjustable wristband 2 may be made from any flexible material that allows it to wrap around a user's wrist. The top outer layer is preferably firmer than the bottom layer that rests against the user's skin. The bottom layer may be fabricated from a soft cushion-like material. The shape, length, width, thickness, size, and other parameters of the adjustable wristband 2 may vary from that depicted in the figures. The wristband 2 may also be made of a number of band sections hingeably linked or otherwise attached to one another.

The wristband 2 includes a non-adjustable wristband component 3 that serves as an electrical conduit. It contains the electrical wiring and insulation that connects the computing mechanism 1 to the input mechanisms 10. The non-adjustable wristband component 3 may be made of any flexible material that allows it to wrap around the user's wrist. The top outer layer is firmer than the bottom layer. The internal layer contains electrical wiring and insulation, which may be fabricated from any type of flexible printed circuit board material. The bottom layer may be made from a soft cushion-like material. The shape, length, width, thickness, size, and other parameters of the non-adjustable wristband component 3 may vary from that depicted in the figures.

Figure 4:
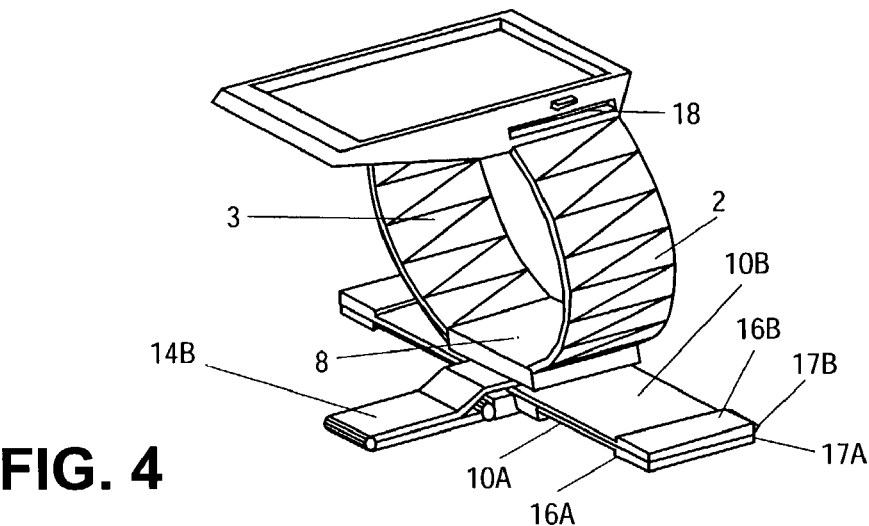
FIG. 4 shows a perspective view of a computing device in which the input mechanisms are between a recessed position and an extended position, according to an embodiment of the invention.
Figure 10:
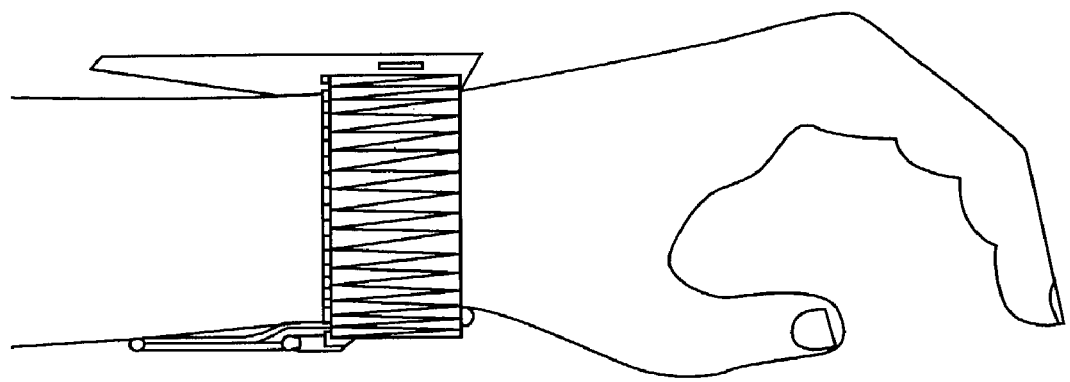
FIGS. 10 and 11 show side views of a computing device being used by a user, according to an embodiment of the invention, in which the input mechanisms are in a recessed position and in an extended position, respectively.
Figure 11:
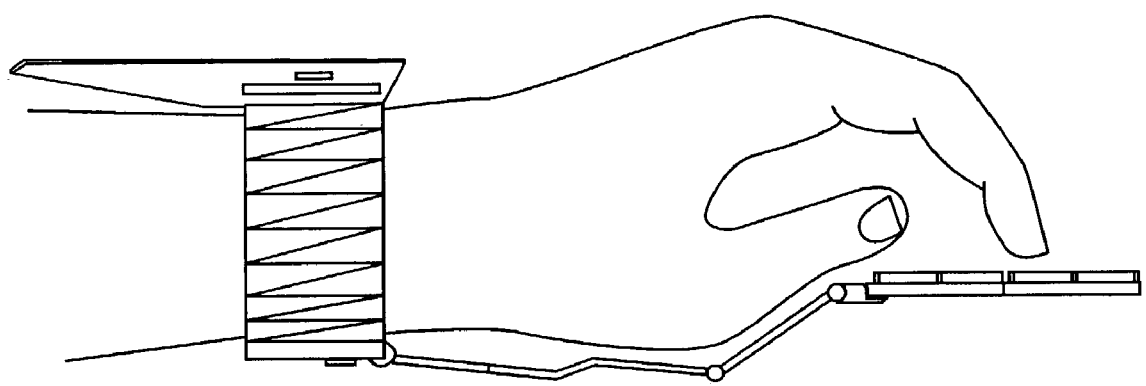

FIG. 4 shows a perspective view of the computing device in which the input mechanisms 10 is between its recessed and extended positions, according to an embodiment of the invention. By comparison, FIGS. 5, 6, 7, 8 and 9 show a perspective view, a side view, a top view, a bottom view, and a front view, respectively, of the computing device in which the input mechanisms 10 are in the extended position, according to an embodiment of the invention. Furthermore, FIGS. 10 and 11 show a side view of the computing device as being used by a user in which the inputs mechanisms 10 are in the recessed position and in the extended position, respectively, according to an embodiment of the invention. The recessed position is for storage of the input mechanisms 10, whereas the extended position is for use by the user of the input mechanisms 10.

Figure 5:
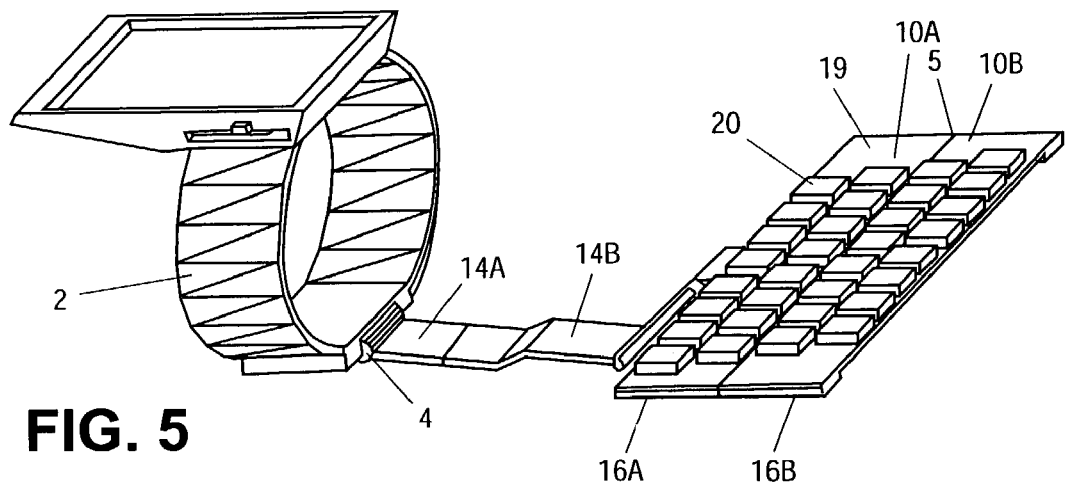
FIGS. 5, 6, 7, 8, and 9 show a perspective view, a side view, a top view, a bottom view, and a front view, respectively, of a computing device, according to an embodiment of the invention, in which the input mechanisms are in an extended position.
Figure 6:
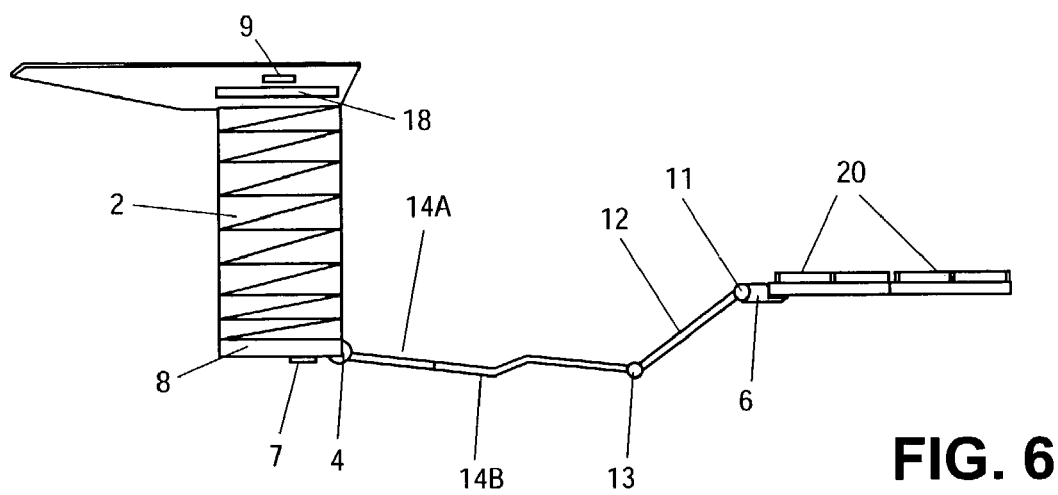
Figure 7:
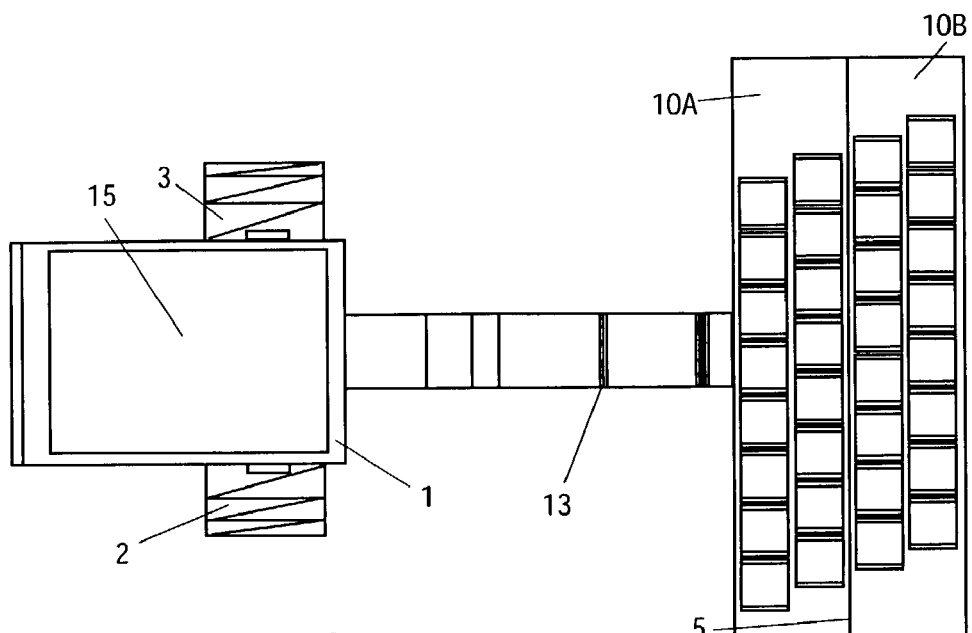
Figure 8:
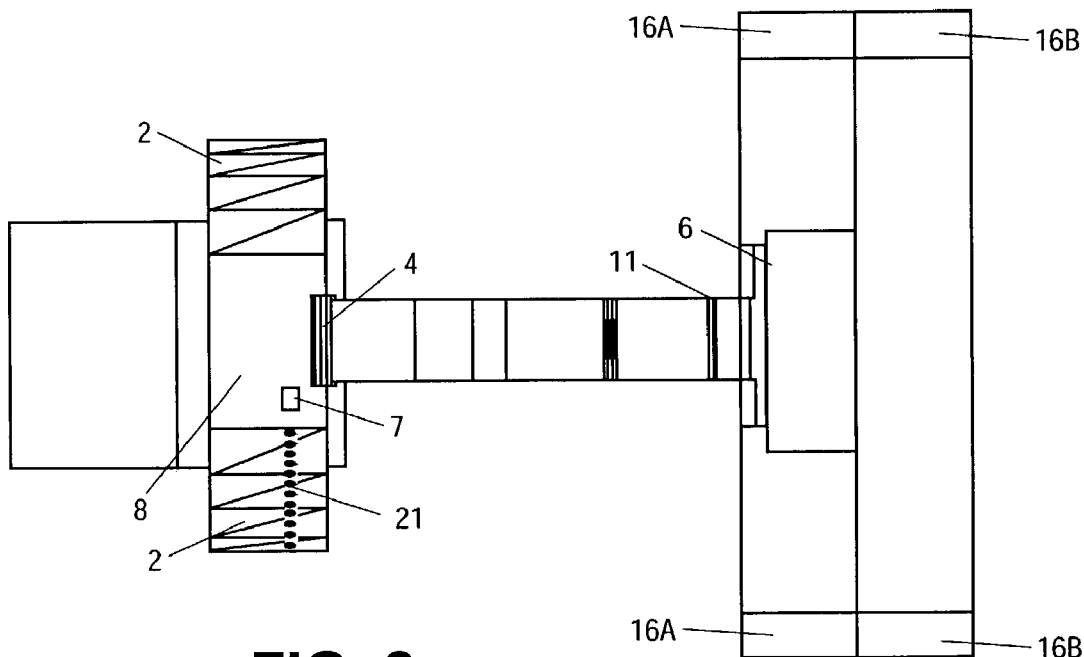
Figure 9:
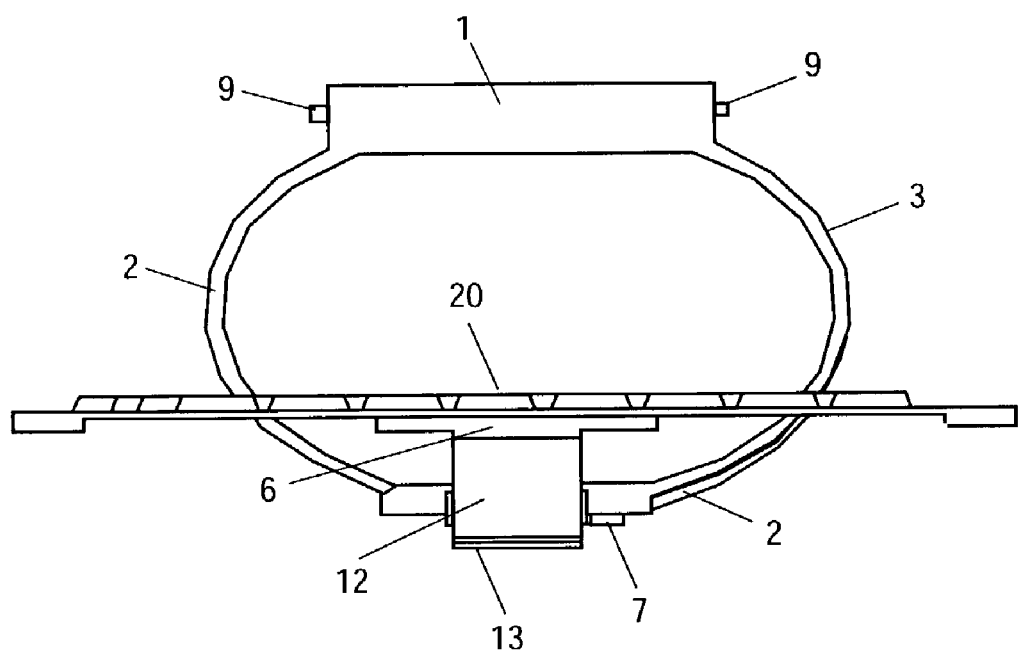

The primary support hinge 4 allows the input mechanisms 10 to be rotated out into its extended position, as specifically depicted in FIG. 5. The primary support hinge 4 also acts in conjunction with the device support base 8 to support the weight of the input mechanisms 10 and its attached extenders 12, 14A, and 14B, and the forces resulting from the user using the input mechanisms 10. The primary support hinge 4 is attached to either side by the device support base 8 and the lower extender 14A. The primary support hinge 4 may be a spring-loaded torque hinge. As such, the primary support hinge 4 may spring out from the recessed position to the extended position once the release button 9 is pressed. In the extended position, it may further be adjusted manually by using the lower extender 14A and the upper extender 14B as a torque lever. Electrical wiring may run through and/or around the primary support hinge 4. The shape, length, width, thickness, compartments, type, material, and other parameters of the primary support hinge 4 may vary from that depicted in the figures.

A flexible connector 5 attaches the upper input mechanism part 10A to the lower input mechanism part 10B. The flexible connector may be made from any flexible and stretchable material. When the upper input mechanism part 10A and the lower input mechanism part 10B are collapsed and folded over, as specifically depicted in FIG. 4, the flexible connector 5 is stretched to accommodate the change in position. The flexible connector 5 is depicted in its most stretched state in FIG. 1, whereas it is depicted in its most relaxed state in FIG. 7. The shape, length, width, thickness, size, type, material, and other parameters of the flexible connector 5 may vary from that depicted in the figures.

The support base 6 connects the lower input mechanism part 10B to the hinge 11, and supports the overall structure of the input mechanisms 10. The support base 6 may be made from a polymer-like material. The support base 6 contains the electrical wiring and connectors that electrically connect the input mechanisms 10 to the computing mechanism 1. The shape, length, width, thickness, size, type, material, and other parameters of the support base 6 may vary.

The wristband lock 7 acts to lock in place or unlock the adjustable wristband 2 by engaging or releasing a locking mechanism that mates with the wristband holes 21. The type of locking mechanism may be a rocker switch or another type of engaging and releasing locking mechanism. The shape, length, width, thickness, size, type, material, method, and other parameters of the wristband lock 7 and its mechanism may vary.

The support base 8 serves as an anchor for the computing mechanism 1 and as a support for weight of the input mechanisms 10 and their extenders. The structure of the support base 8 may be composed of a rigid polymer-based material. The top outer layer that lies flush against the user's wrist may have a soft cushion-like material. The internal structure contains electrical wiring and connectors that connect it to the non-adjustable wristband component 3 and the primary support hinge 4. The support base 8 has a hollow slot for the adjustable wristband 2 to pass through and also contains the components for the locking mechanism used in conjunction with the wristband lock 7. The shape, length, width, thickness, size, type, material, arrangement, compartments, and other parameters of the support base 8 may vary.

The release button 9, when depressed, causes the input mechanisms 10 to be released from the slot 18 while the input mechanisms 10 are in their recessed position. Once the release button 9 is depressed the input mechanisms 10 spring out into the partially extended position depicted in FIG. 4 and possibly further into the extended position depicted in FIG. 5, depending on the properties of the primary support hinge 4, the type of secondary support hinge, and the type of hinge 11 incorporated in the construction of a particular embodiment of the invention.

The input mechanisms 10 serve as a very thin and flexible data input interface that wraps about the user's wrist when in the recessed position, as depicted in FIG. 3, and lies substantially at and beneath the user's fingers in the extended position, as depicted in FIG. 11. The input mechanisms 10 include a lower input mechanism part 10B and an upper input mechanism part 10A connected by the flexible connector 5. Each of the parts 10A and 10B may be made from a very thin flexible polymer or dielectric-based or any other suitable material. The materials chosen are thin and flexible enough to wrap around a user's wrist, and preferably have a default horizontal state and requires an external force to be put in the recessed position. In an alternative embodiment, such as in FIG. 30, the material of the input mechanism parts 10A and 10B may have a default curved state in the recessed folded position. The materials chosen also are preferably sufficiently strong to withstand continual flexing between the recessed and extended positions with minimal hysteresis or distortion. The shape, length, width, thickness, size, type, material, arrangement, compartments and other parameters of the parts 10A and 10B may vary.

Each of the parts 10A and 10B have two slightly thicker endpoints, an upper endpoint 16A and a lower endpoint 16B, on either side. The shape, length, width, thickness, size, type, material, arrangement, and other parameters of these endpoints may vary. The endpoint 16A has a male connector 17A that snaps and locks into the female slot 17B on the lower endpoint 16B. The male-female connectors act to stabilize the endpoints 16A and 16B when the input mechanisms 10 are in the extended position and being used by the user. The locations of the connector 17A and the slot 17B may be interchanged during construction of a particular embodiment of the invention. The connector 17A and the slot 17B also contain electrical connectors that make contact and complete an electrical circuit when the two connectors are mated and the input mechanisms 10 are in the extended position, as depicted in FIG. 5. The shape, length, width, thickness, size, type, material, arrangement, compartments, and other parameters of the connector 17A and the slot 17B may vary.

Running along the bottom, top, internal, or any partial combination thereof of input mechanism sections 10A and 10B is electrical wiring on a flexible printed circuit board that may or may not contain via holes. The electrical wiring transmits key presses and input device movement signals to the computing mechanism 1. The input mechanisms 10 preferably contain both keyboard keys 20 and an input device touch pad 19. The keys 20 may be partially raised or totally flat. In the case of the keys 20 being raised, the top part may be made of a very thin polymer or silicone rubber-based material with a very thin electrode attached on its bottom side to close the switch, as is described later in the detailed description. The sidewalls or support structure for the top part of the keys 20 may be made of a very thin silicone rubber-based material, or any material that easily compressed under the application of an external force, as is also described later in the detailed description.

Alternatively, the keys 20 may be flat and require only visible ink or print to show the corresponding layout. The key press for such a flat layout may be determined by using the conductivity of the user's fingers in completing a circuit and determining the position. The touch pad 19 is a flat area and may use the conductivity or pressure of the user's finger to determine its position and movement. The shape, length, width, thickness, height, size, type, material, arrangement, compartments, electrical characteristics, layout, configuration, structure, key press detection mechanism, addition or omission of keys or input device buttons, and other parameters of the keys 20 and the touch pad 19 may vary.

The hinge 11 allows the rotation of the input mechanisms 10 to accommodate various user preferences as well as to support and connect both structurally and electrically to the support base 6 and the extender 12. The hinge 11 may be a spring-loaded torque hinge and mimic the basic internal and external structure and function of the primary support hinge 4 already described. The shape, length, width, thickness, size, compartments, type, material, and other parameters of the hinge 11 may vary.

The extender 12 acts as a lever and allows the user to adjust the height and angle of the input mechanisms 10 and also supports the weight of the input mechanisms 10. The extender 12 may be made from a lightweight polymer material with a hollow interior to allow flexing and movement of the electrical wiring during positional state changes. Internally it may contain loose-fitting flexible electrical wiring and connectors that connect it to the hinge 11 and the secondary support hinge 13. The shape, length, width, thickness, size, compartments, type, material, and other parameters of the extender 12 may vary.

The secondary support hinge 13 allows the rotation of the upper extender 14B and the extender 12 to accommodate various use preferences as well as to support and connect both structurally and electrically to the upper extender 14B and the extender 12.

The secondary support hinge 13 may be a spring-loaded torque hinge and mimic the basic internal and external structure and function of the primary support 4 that has been described. The shape, length, width, thickness, size, compartments, type, material, and other parameters of the secondary support hinge 13 may vary.

The lower extender 14A acts in conjunction with the upper extender 14B as a lever that allows the user to adjust the angle and height of the input mechanisms 10 and also supports the weight of the input mechanisms 10. The upper extender 14B also has the ability to slide forward and extend or length the resultant distance of the input mechanisms 10. This allows users with different sized or length hands or fingers to adjust a particular embodiment of the invention to accommodate their preferences.

The lower extender 14A and the upper extender 14B may be made from a thin rigid lightweight polymer material with a hollow interior to allow flexing and movement of the electrical wiring during positional state changes. The upper extender 14B is attached to the lower extender 14A by a grooved sliding connector or connectors. The lower extender 14A internally may contain loose-fitting flexible electrical wiring and connectors that connect it to the primary support hinge 4 and to the groove sliding connector(s). The upper extender 14B internally may contain loose-fitting flexible electrical wiring and connectors that connect it to the secondary support hinge 13 and to the grooved sliding connector(s). The shape, length, width, thickness, size, compartments, type, material, and other parameters of the lower and upper extenders 14A and 14B may vary, although such variations are not depicted in the figures.

Figure 12:
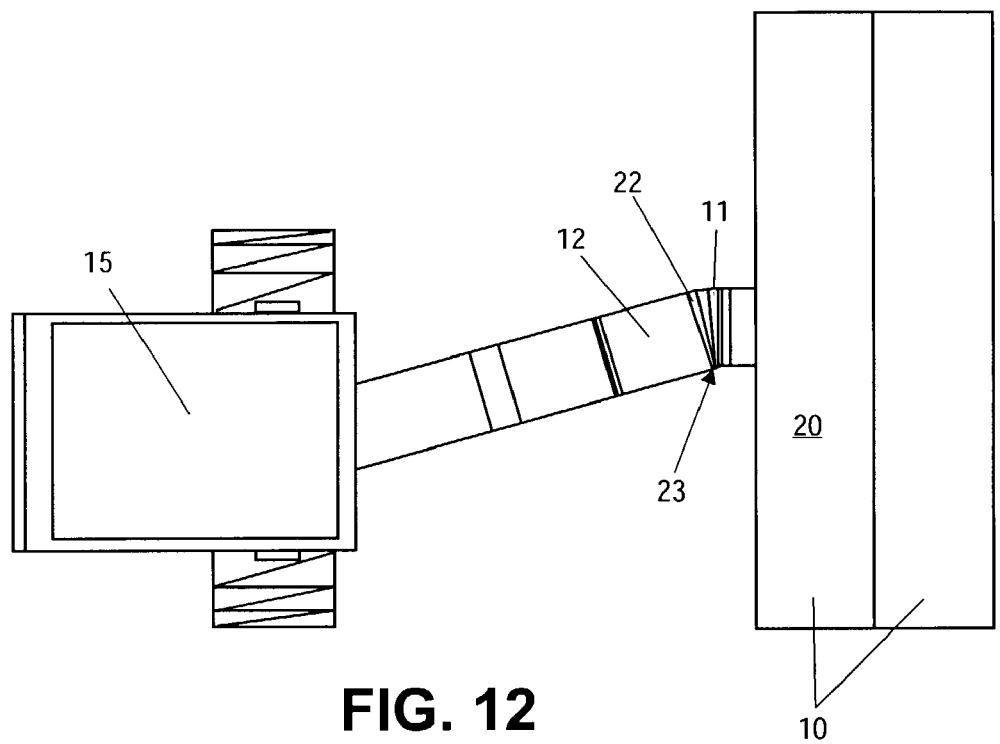
FIG. 12 shows a top view of a computing device, according to an alternative embodiment of the invention, in which the device is in a rotated, two-handed state.

FIG. 12 shows the top view of the computing device, according to an alternative embodiment of the invention. The computing device is depicted in FIG. 12 in the extended positioned, and in which it is in a rotated, two-handed state. The touch pad pivot 23 allows the input mechanisms 10 to slightly rotate. The touch pad hinge 11 is attached to a pivot extender 22. The pivot extender 22 acts as a rotating brace in conjunction with the extender 12 that has a female slot to allow for the pivot extender 22 to rotate in and out. A similar arrangement is also used for the primary support hinge 4 and the lower extender 14A. The shape, length, width, thickness, size, compartments, type, mechanisms, material, and other parameters may vary from that depicted in FIG. 12.

Figure 13:
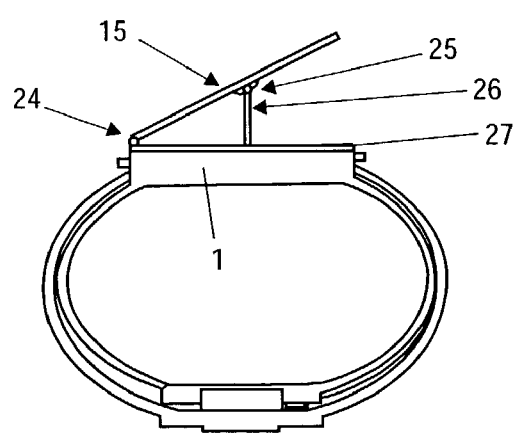
FIG. 13 shows a front view of a computing device, according to an alternative embodiment of the invention, in which the display mechanism is rotatable from a flat position to a raised position.

FIG. 13 shows the front view of the computing device, according to another alternative embodiment of the invention. The computing device is depicted in FIG. 13 in the recessed position with the display mechanism 15 at an angle. The display mechanism 15 may be rotated about an axial hinge 24. The axial hinge 24 also has electrical wire running through or around it that connects the display mechanism 15 to the rotational connector 27. The display mechanism 27 is also attached to the rotational connector 27 by a connector hinge 25 that is connected to an adjustable support rod 26, which is connected to torqued notched grooves or tracks on either edge and side of the rotation connector 27. The display mechanism 27 is thus rotatable from a flat position to a raised position, and vice-versa, such that the raised position is user controlled for optimal viewing of the display mechanism 27.

The adjustable support rod 26 moves up and down the torqued notched grooves or tracks on the rotational connector 27 when the user applies an external force to move the adjustable support rod 26 forward or back a notch by lifting or pushing down the display mechanism 15. The rotational connector 27 allows the display mechanism 15 to be rotated about a hollow cylindrical axis in the center of the rotational connector 27. The hollow cylindrical axis allows the rotational connector 27 rotate about the computing mechanism 27 and also allows loosely connected and flexible wiring to electrically connect the connector 27 to the computing mechanism 27 through the hollow cylindrical axis connector. The shape, length, width, thickness, size, compartments, type, mechanisms, material, and other parameters of these components may vary from that depicted in FIG. 13.

Figure 14:
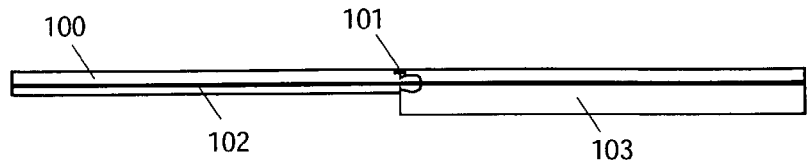
FIGS. 14, 15, 16, 17, 18, 19, and 20 are diagrams of varying views showing the keys of a computing device can be implemented, according to an embodiment of the invention.
Figure 15:
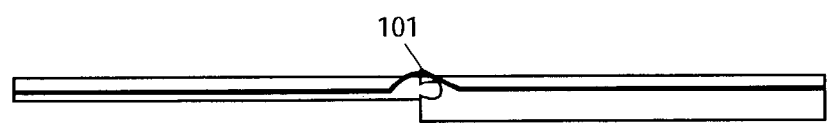

FIGS. 14, 15, 16, 17, 18, 19, and 20 show how the keys 20 of the computing device can be implemented, according to some embodiments of the invention. FIG. 14 is a side-view cross section of the keyboard sections 100 with the electrical wiring being routed via the male connector 104 and the female receptor 105 upon contact. There is a flexible connector 101 connecting the keyboard sections 100 with one another. The keyboard sections 100 include electrical circuitry 102, and a bottom keyboard section 103. FIG. 15 shows a side-view cross section of an alternative embodiment in which the electrical wiring is routed through the flexible connector 101.

Figure 16:
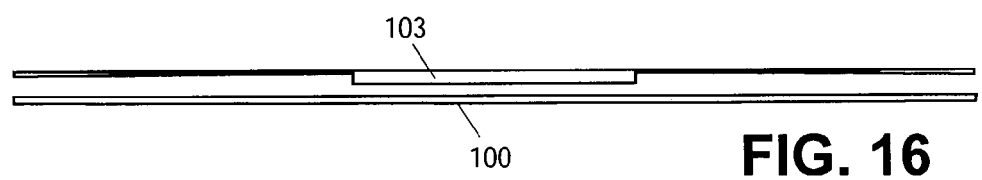
Figure 17:
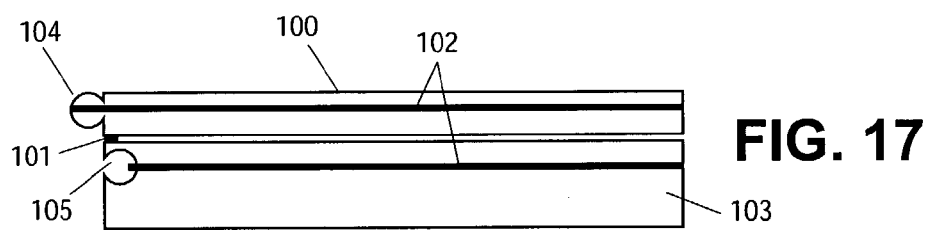
Figure 18:
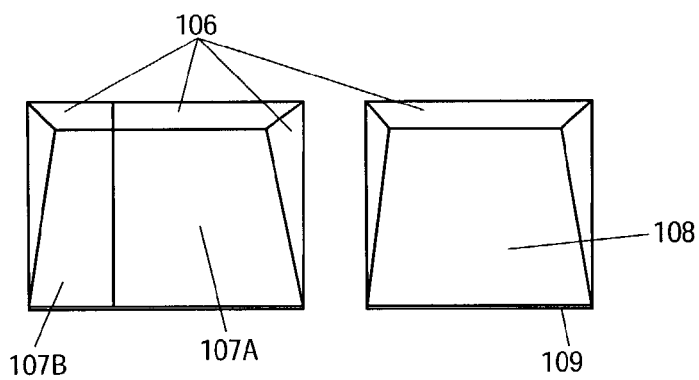

FIG. 16 is a front-view cross section of the keyboard sections 100. The bottom keyboard section 103 contains a thicker midsection to house the electrical circuitry 102 and the electrical connectors, both to the keyboard section 100 and the keyboard extender support 125, the latter which is not shown in FIG. 16. The keypad endpoints are slightly thinner. FIG. 17 is a side-view cross section of collapsed or folded keyboard sections. FIG. 18 shows a top view of a dual-section key having a left section 107B that is smaller than the right section 107A. Both key sections have separate electrical pads, or contacts. The key has a key top divided into a regular key section and miniature key section, each of which can go between a depressed position and a non-depressed position. The left section 107B acts as a shift between one key and other key, without taking up the full space or size of a separate key. Pressing the right section 107A registers only the right section 107A, while pressing either the left section 107B or both the right and the left sections 107A and 107B simultaneously registers the left section 107B.

Figure 19:
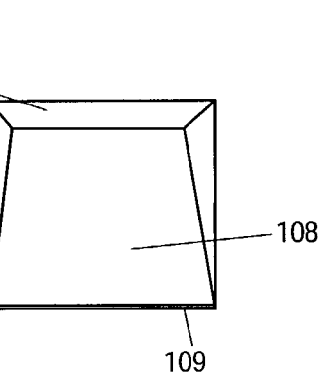
Figure 20:
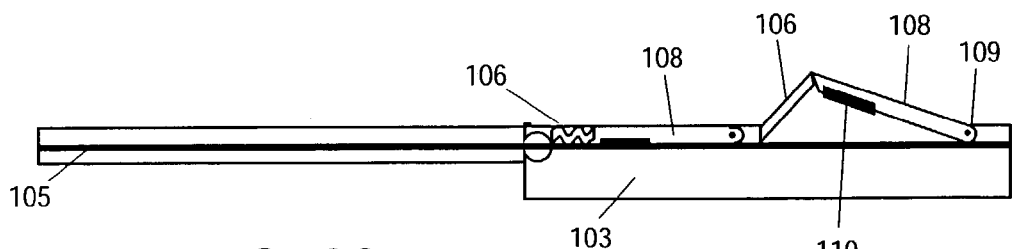

FIG. 19 is a top view of a single-section key 108. The key 108 is attached at a pivot point or axis 109 that equally distributes the force across the entire plane of the key during a key press, similar to the scissors utilized in laptop computer keyboards, but without the necessity of the scissor components. This is accomplished with a compressible and resilient support 106 on the outer edges, as opposed to being underneath. The support 106 may be rubber silicone or another type of material. This design allows for optimal compression into the plane of the keypad sections 100 and 103 and a very thin profile. FIG. 20 is a side-view cross section showing a depressed key 108 and a compressed support 106 lying in the plane of the bottom keyboard section 103, as well as a non-compressed support 106 and non-depressed key 108. An electrical pad 110 is on the underside of the key 108.

Figure 21:
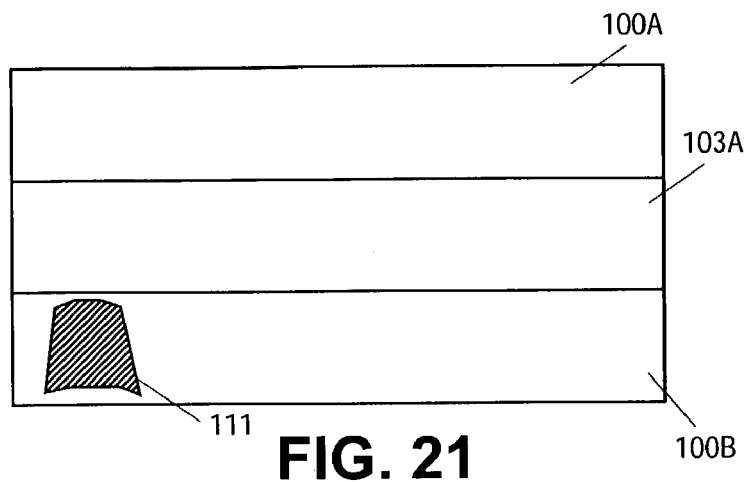
FIGS. 21, 22, and 23 show a top view, a side view, and a front view, respectively, of a thumb-held computing and/or input device, according to an embodiment of the invention.
Figure 22:
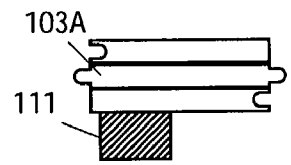
Figure 23:

FIGS. 21, 22, and 23 show a top view, a side view, and a front view, respectively, of a computing device and/or an input device, according to an alternative embodiment of the invention. The device of FIGS. 21, 22, and 23 is a thumb-held wired or wireless device, and is specifically depicted as a wireless device in FIGS. 21, 22, and 23. The wireless electrical circuitry may be included in the bottom keyboard section 100B, and the electrical connections are the same as described for the device of FIGS. 1–11. In this embodiment of the invention, the user may store the device in a pocket, for instance, and quickly pull out the device for utilization. The device allows for one-handed use without the needed for a flat surface, by being supported by the user's thumb.

The user's thumb slides into an elastic band 111 and thus supports the weight of the device, enabling the user to use the fingers of his or her hand to utilize the keys of the keyboard sections. The elastic band 111 is more generally considered a thumb loop. The thumb-held device may include one or more folds separating the keyboard sections, with the device of the embodiment of FIGS. 21, 22, and 23 depicting two folds separating the keyboard sections 100A, 100B, and 103A. Each keyboard section supports a number of keys, not shown in the figures, which may be implemented as has been described in conjunction with FIGS. 14–19, or in another manner. When the keyboard sections fold out, they are substantially extended end to end with respect to one another in an extended position, enabling the user to use the device. By comparison, in a folded position, the keyboard sections are folded over one another, such that the device can be stored.

Figure 24:
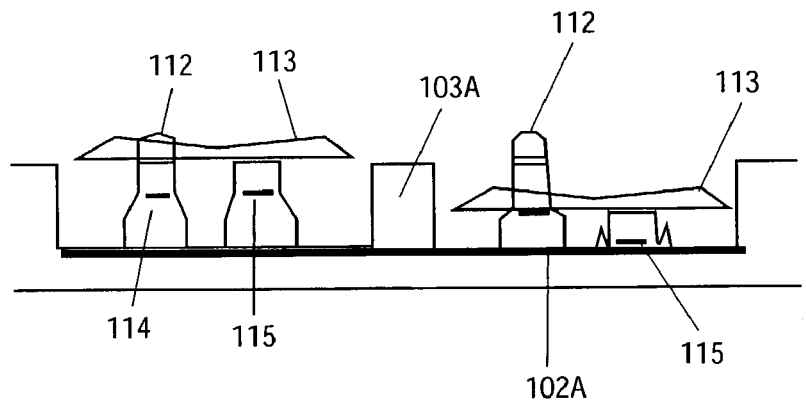
FIGS. 24 and 25 show a side-view cross section and a top view, respectively, of how keys of a device can be implemented, according to another embodiment of the invention.
Figure 25:
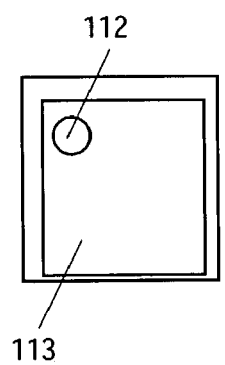

FIGS. 24 and 25 show a side-view cross section and a top view of how the keys of the device of FIGS. 21–23 and/or the device of FIGS. 1–11 may be implemented, according to a specific embodiment of the invention. The keys 112 and 113 are shown as depressed and not depressed in FIG. 24. That is, the keys 112 and 113 have key tops that can go between a depressed position and a non-depressed position. The keys 112 and 113 are similar to those found on standard laptop computer devices, where the scissor supports are not shown for illustrative clarity, except that the keys 112 and 113 are thinner and contain a miniature key within the larger standard-sized key 113, with corresponding supports 114 and 115, respectively. This allows for the saving of space. The keys 112 and 113 lie in the plane of a keyboard section to ensure a thin profile. The supports 114 and 115 are preferably compressible and resilient, and may be fabricated from rubber silicone. The supports 114 and 115 preferably include electrical pads, or contacts, that register their depression. Alternative key designs may be used as well.

Figure 26:
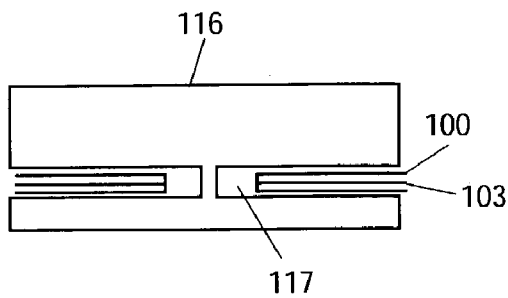
FIGS. 26 and 27 show a front-view cross-section and a side-view cross section, respectively, of a wrist-worn computing device, according to an embodiment of the invention, in a recessed position.
Figure 27:
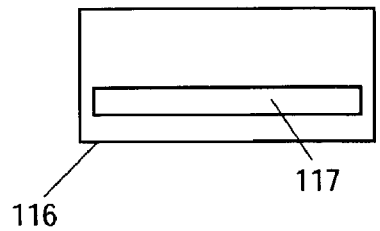

FIGS. 26 and 27 show a front-view cross-section and a side-view cross section, respectively, of a wrist-worn computing device, according to an embodiment of the invention, in the recessed position. The left and the right endpoints of the keyboard sections 100 and 103 are particularly in their recessed position on the user's wrist. This shows how the lengths of the keyboard sections 100 and 103 can be adjusted to fit differently sized wrists. A smaller radius wrist may show the keyboard end points on the left and right closer together, whereas a larger radius wrist may show the left and the right keyboard endpoints farther apart within the slot 117. The structural casing 116 and the hollow keyboard slot 117 house the keyboard sections 100 and 103 in the recessed position.

Figure 28:
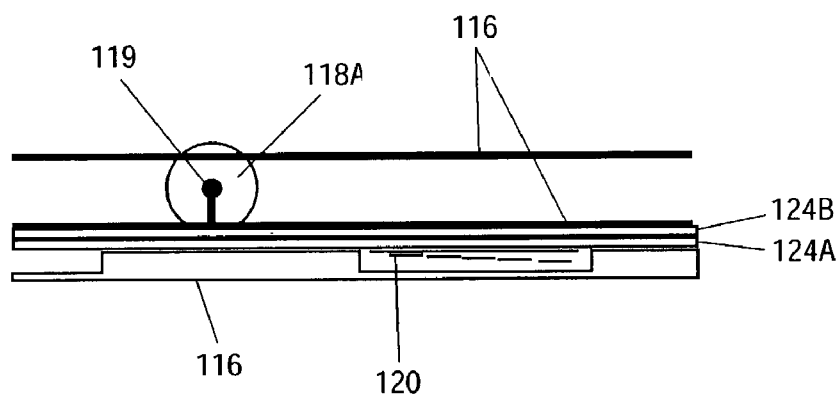
FIGS. 28 and 29 show a front-view cross-section and a top-view cross section, respectively, of the mechanical gears and components used to adjust wristbands of a wrist-worn computing device, according to an embodiment of the invention.
Figure 29:
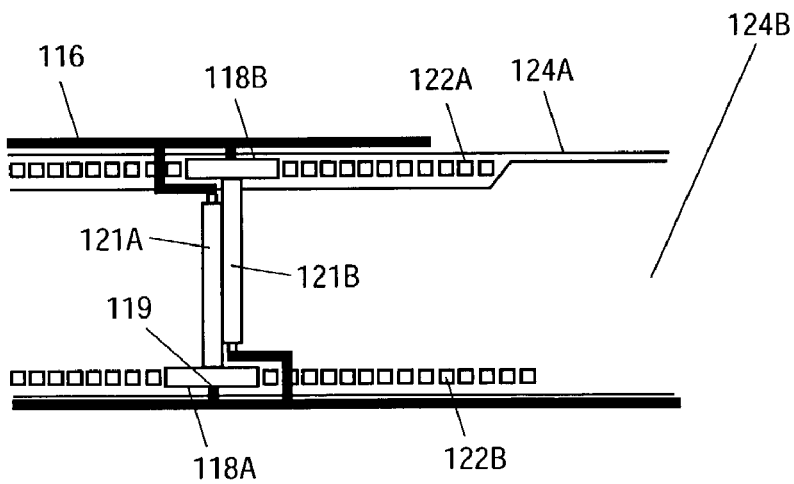

FIGS. 28 and 29 show a front-view cross section and a top-view cross section, respectively, of the mechanical gears and components used to adjust a user's wristbands 124A and 124B of a wrist-worn computing device, according to an embodiment of the invention. The wristbands 124A and 124B can be adjusted for differently sized wrists. Rotation of an adjustable wristband gear rotator 118A causes an adjustable wristband gear rotational translator 121A to rotate, which via its gear teeth causes the gear teeth of an adjustable wristband gear rotational translator 121B to rotate in the opposite direction.

This mechanism causes the adjustable wristband 124A and 124B to increase and decrease simultaneously in and out of the hollow non-adjustable wristband sleeves 123A and 123B, thus keeping the wristband keyboard support 130 stationery and centered beneath the user's wrist. The rotator 118A, and its counterpart rotator 118B, are supported by the support 119. The translator 121B has a counterpart translator 121A as well. Also depicted are the adjustable wristband gear hole receptors 122A and 122B. All of these components may be considered in sum as an adjustable gear rotational mechanism in one embodiment of the invention, to adjust the band to fit the user's wrist.

Figure 30:
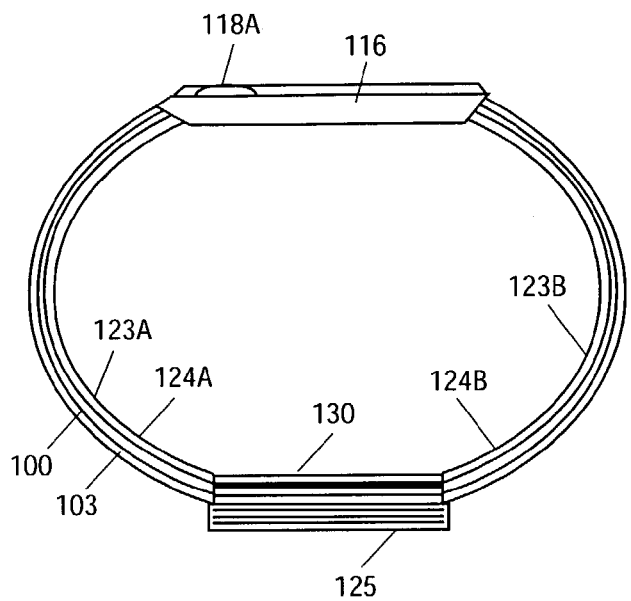
FIGS. 30, 31, and 32 show a front view, a side-view cross section, and a side view of a wrist-worn computing device that employs a slide-out mechanism to switch between a recessed position and an extended position, according to an embodiment of the invention.
Figure 31:
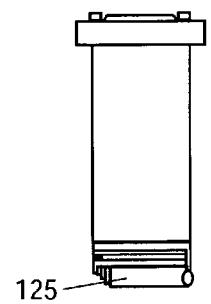
Figure 32:
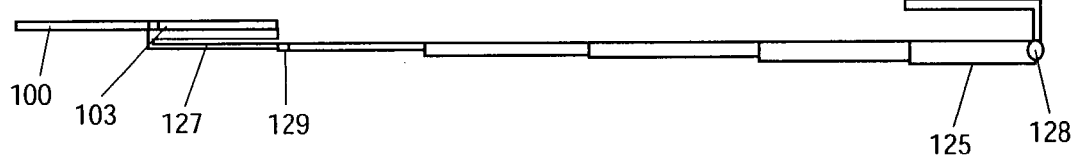

FIGS. 30, 31, and 32 show a front view, a side-view cross section, and a side view of a wrist-worn computing device, according to an alternative embodiment of the invention. In FIG. 31 the wrist-worn computing device is in the recessed position, whereas in FIG. 32 the wrist-worn computing device is in the extended position. The computing device of FIGS. 30, 31, and 32 differs from that of FIGS. 1–11 in that a slide-out mechanism is used to switch between the recessed position and the extended position, as opposed to a fold-out mechanism. The internal electrical wiring is attached via a loose connection connected at no less than two endpoints of the extreme endpoints of the slider extender support 125 and the slider endpoint connector 127. Alternatively, the wiring may be embedded in the casing of the slider support 125 to maintain physical contact during expansion and contraction. Also depicted are the display mechanism 126, an extender support torque hinge 128, an input mechanism support torque hinge 129, and a wristband keyboard support 130.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A wrist worn computing device comprising:
   an adjustable thin wristband wrapped around a wrist of a user;
   an extender mechanism attached to the wristband such that the extender mechanism has a recessed position and an extended position;
   an input mechanism attached to the extender mechanism such that the input mechanism has a recessed position in conjunction with the extender mechanism in which the input mechanism is wrapped around the wristband, and an extended position in conjunction with the extender mechanism such that the input mechanism is unwrapped from around the wristband and extended such that it is substantially positioned beneath fingertips of the user without being detached;
   a display mechanism attached to the wristband within a structural housing of the wrist worn computing device and positionable above the wrist of the user; and
   a computing mechanism attached to the structural housing of the adjustable thin wristband.

2. The computing device of claim 1, wherein the adjustable thin wristband comprises:
   a firm support section beneath the wrist of the user, the firm support section being attached to the extender mechanism; and,
   hollow sleeves on either side of the firm support section through which the wristband passes as the wristband is adjusted, the hollow sleeves attached to the structural housing above the wrist of the user.

3. The computing device of claim 2, wherein the adjustable thin wristband has two ends that overlap when the wristband is wrapped around the wrist of the user and that meet above the wrist of the user inside the structural housing.

4. The computing device of claim 3, wherein the adjustable thin wristband further comprises:
   overlapping sections in which one of grooves and holes are defined;
   a rotational gear mechanism controlled by the user and enclosed within the structural housing above the wrist of the user, such that the rotational gear mechanism is operably coupled to the overlapping sections of the wrist band via the one of the grooves and the holes,
   wherein rotation of the gear mechanism causes the ends of the wristband when overlapping to move in opposing directions at an equal distance and rate, the rotation keeping the firm support section of the wristband substantially centered beneath the wrist of the user during adjustment.

5. The computing device of claim 4, wherein the adjustable thin wristband further comprises at least one of electrical wiring and connectors electrically coupling the wristband to the computing mechanism and the extender mechanism.

6. The computing device of claim 1, wherein the extender mechanism comprises one of hinged and torqued hinged joints at each of a plurality of axes of the extender mechanism, about which the extender mechanism folds out and in to the extended and the recessed positions, respectively.

7. The computing device of claim 6, wherein the one of hinged and torqued hinge joints further are at each of a plurality of endpoints of the extender mechanism.

8. The computing device of claim 1, wherein the extender mechanism slides out and in to the extended and the recessed positions, respectively.

9. The computing device of claim 1, wherein the extender mechanism further is able to rotate about at least one of an axis perpendicular to a plane of the extender mechanism and an axis parallel to the plane.

10. The computing device of claim 1, wherein the extender mechanism comprises at least one of electrical wiring and connectors that electrically connect the extender mechanism to the wristband the input mechanism.

11. The computing device of claim 1, wherein the input mechanism comprises:
    a plurality of thin flexible sections, each section containing one of a plurality of keys and a pointing device, and having one or more folds between the sections;
    a flexible connector at each fold connection the sections together at least one of physically and electrically,
    wherein in the recessed position the sections are one of collapsed and folded on top of one another such that the plurality of keys and the pointing device are at least one of compressed and sandwiched in between the sections, and in the extended position the sections are unfolded such that the plurality of the keys and the pointing device are exposed and useable by the user.

12. The computing device of claim 11, wherein the sections of the input mechanism have alternate male and female connections such that corresponding male-female connectors of the input mechanism mate in the extended unfolded position and separate in recessed folded position, the male-female connectors serving to at least one substantially lock in place the sections of the input mechanism and electrically connect while in the extended position.

13. The computing device of claim 12, wherein the sections of the input mechanism have at least one of embedded circuitry and electrical connectors, the embedded circuitry, the electrical connectors, and the male-female connectors located at one of slightly thicker areas and layers of the sections.

14. The computing device of claim 11, wherein the sections of the input mechanism have one of a default flat position and a default curved position.

15. The computing device of claim 11, wherein the sections of the input mechanism have ends lying above and separated from overlapping ends of the wristband while being within a slot of the structural housing the recessed position.

16. The computing device of claim 11, wherein at least one of the sections of the input mechanism has a plurality of keys, wherein each key has a default non-depressed position and a depressed position, each key comprising:
    at least four sides;
    an electrical contact beneath the key;
    a resilient and compressible support attached to at least one of the sides of key;
    one of an axial hinge and a flexible connector attached to exactly one of the sides of the key,
    wherein each key in the non-depressed position rises at an angels from a plane of the section of the input mechanism and the resilient and compressible material is non-depressed such that the material supports an upper most part of the key above the plane while the one of the axial hinge and the flexible connector lies within the plane of the section at a lower side of the key, and
    wherein each key in the depressed position rotates downward about the one of the axial hinge and the flexible connector until all the sides of the key and the resilient compressible support lie within the plane of the section and complete and electrical circuit.

17. The computing device of claim 16, wherein each of the plurality of keys has two sections directly adjoining one another with a width of a first section slightly smaller than a width of a second section, and each section being independently operable.

18. The computing device of claim 11, wherein the input mechanism is able to rotate about at least one of an axis perpendicular to a plane of the input mechanism and an axis parallel to the plane of the input mechanism, via connection with the extender mechanism.

19. The computing device of claim 1, wherein the display mechanism is at least one of adjustable and able to rotate about an axis perpendicular to a plane of the display mechanism and about an axis parallel to the plane of the display mechanism.

20. The computing device of claim 1, wherein the display mechanism is able to rotate about an axis perpendicular to a plane of the display mechanism and about an axis parallel to the plane of the display mechanism, via a torque hinge thereof.

21. The computing device of claim 1, wherein the computing mechanism contains at least most of electronic circuitry by which the computing device operates, the structural housing supporting components of the computing device.

22. A wrist worn computing device comprising:

an adjustable thing wristband wrapped around a wrist of a user;

an extender mechanism attached to the wristband such that the extender mechanism has a recessed position and an extended position;

an input mechanism attached to the extender mechanism such that the input mechanism has a recessed position in conjunction with the extender mechanism in which the input mechanism is wrapped around the wristband, and an extended position in conjunction with the extender mechanism such that the input mechanism is unwrapped from around the wristband and extended such that it is substantially positioned beneath fingertips of the user without being detached; and;

at least one of:

a display mechanism attached to the wristband within a structural housing of the wrist worn computing device and positionable above the wrist of the user; and a computing mechanism attached to the structural housing of the adjustable thing wristband.

* * * * *